D. LAUER.
FASTENER.
APPLICATION FILED MAY 16, 1916.
1,220,435.
Patented Mar. 27, 1917.
Fig. 1.
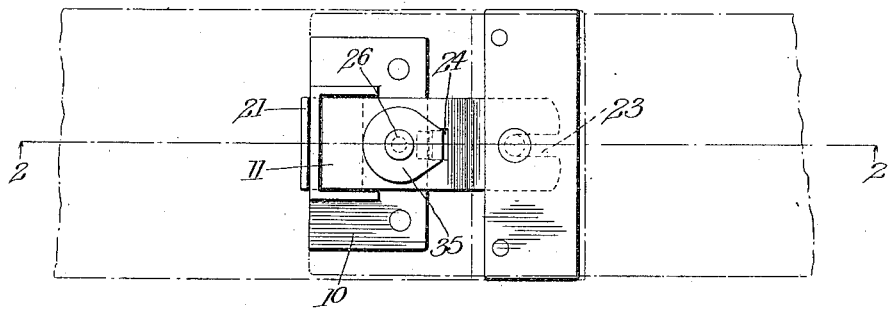
Fig. 2.
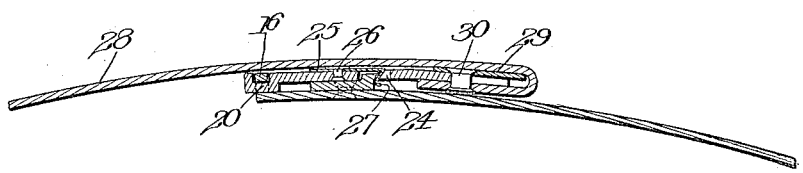
Fig. 4.
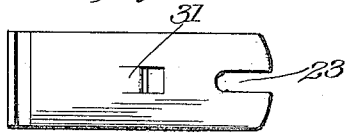
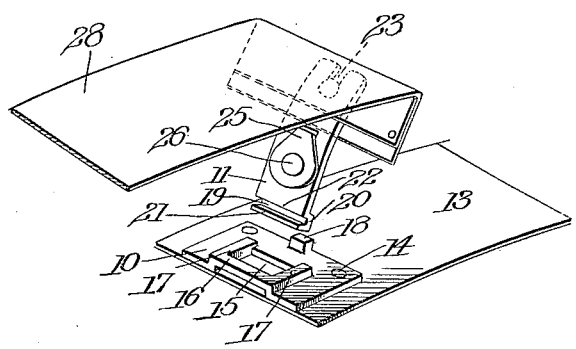
Fig. 3.
Fig. 5.
Witnesses
G. F. Baker.
H. P. Jennings.
Inventor
Daniel Lauer
by Foster Freeman Watson & Coit
Attorney

UNITED STATES PATENT OFFICE.

DANIEL LAUER, OF YORK, PENNSYLVANIA.

FASTENER.

1,220,435.

Specification of Letters Patent.

Patented Mar. 27, 1917.

Application filed May 16, 1916. Serial No. 97,986.

*To all whom it may concern:*

Be it known that I, DANIEL LAUER, a citizen of the United States, residing at York, county of York, State of Pennsylvania, have invented certain new and useful Improvements in Fasteners, of which the following is a specification.

This invention relates to fasteners and more particularly to devices of this class which are adapted to connect two members and hold them under a substantial tension.

The objects of the invention are to provide a fastener which may be manufactured at a minimum cost, which will present a neat appearance, no parts projecting; to provide a fastener which will automatically remain in closed position; to make such a device so that the members may be easily connected, the very operation of the closing of the fastener producing the desired tension in the two members connected; and to provide a fastener one member of which may be made so that when assembled in position it will give the desired tension on the members connected.

These and other features of the invention will be described in connection with accompanying drawings and pointed out in the claims.

In the drawings in which like reference characters indicate like parts,

Figure 1 is a top plan view of the fastener in closed position;

Fig. 2 is a longitudinal section on the line 2—2 of Fig. 1;

Fig. 3 is a perspective view showing the fastener in open position;

Fig. 4 is a plan view of a different form of one of the members; and

Fig. 5 is a longitudinal section through the member shown in Fig. 4.

As shown in the drawings, the fastener comprises the two main parts 10 and 11, each of which is adapted to be attached to the ends of the members which it is desired to fasten together. The part 10 consists of a plate which may be attached to the end of the member 13 in any desired manner, such as by the rivets 14. This plate is formed with an aperture 15 adjacent one edge, the material between the aperture and the edge being offset from the plane of the plate proper to form a rib 16. The two edges of the aperture adjacent the said rib 16 are extended upwardly from the face of the plate in the same direction as the rib to form ridges 17. At the edge of the plate opposite the rib 16 an upstanding lug 18 is provided.

The part 11 comprises a substantially oblong plate, the material at one end of the same being offset to form a channel 19 on one side and an upstanding ridge 20 on the other. The sides of the channel 19 are formed by the flange 21 and the abutment 22. The opposite end of this plate is formed with a slot 23. Different plates may be provided with slots of different depths for a purpose to be described later. Intermediate of the ends of the plate an aperture 24 is provided. A spring member 25 is attached to the plate in any suitable manner, such as by means of a rivet 26. This spring member has a bent end 27 which projects through the aperture 24 and is inclined slightly toward the end of the plate having the channel 19. This plate is adapted to be connected to a member such as 28 at the end having the slot 23. This member 28 is wrapped around a plate 29 and the end of the plate 11, and a rivet 30 or other suitable attaching means is passed through the end of the member 28, the slot 23 and the plate 29. Thus, as clearly shown in Fig. 2, the member 28 completely covers all parts of the fastener. From an inspection of Fig. 2 it will be apparent that the rib 16 is offset from the plate 10 to such a distance that the flange 21 may pass under the said rib and the channel 19 receive the same. Furthermore, the location of the end 27 of the spring is such that when the rib 16 lies in the channel 19 it will take over the lug 18.

In the operation of the device the flange 21 is inserted under the rib 16 so that the said rib will lie in the channel 19, the abutment 22 then pivots on the rib 16 as a fulcrum and when the opposite end of the upper plate is pressed downwardly toward the member 13 the upper plate will act as a lever and pull the two members 28 and 13 toward each other. On continued movement of the upper plate the end 27 of the spring, which is in effect a spring catch, will spring over the lug 18, thus securing the parts in closed position.

In Figs. 4 and 5 a modified form of the plate 11 is shown. Instead of making the spring 25 separate, a tongue 31 is cut out and bent up from the plate to form a spring 32. Thus a single piece of material may be used from which the entire part may be manufactured.

The fastener is particularly adapted for shoes, gloves and similar devices. It is obvious that, if a given plate 11 will not act to produce the desired tension in the joining of the two members 28 and 13, another plate 11 may be substituted in which the slot 23 is not so deep. This is equivalent to removing the attaching point of the plate 11 to the member 28 to the right in Fig. 2, which obviously will put the two members 28 and 13 under greater tension when the fastener is closed. The parts of the device may be made from sheet material pressed out to the desired form or they may be made as die castings, or in any other suitable manner. It is obvious, however, that the fastener is so simple and so designed that it may be manufactured very cheaply and with a minimum number of operations.

Having thus described the invention, what is claimed and desired to be secured by Letters Patent is:

1. A fastener for detachably connecting two elements comprising a plate formed with an aperture spaced from one edge to form a rib and an upstanding lug adjacent the opposite edge, a member provided with means adapted to coöperate with said rib whereby the rib acts as a fulcrum, and a spring tongue adapted to be forced down on the outside of said lug and thereby lock the parts in closed position, and means whereby the plate may be attached to one of said elements and the said member to the other element.

2. A fastener for detachably connecting the ends of two elements comprising a plate formed with a rib adjacent one edge, a lug adjacent the opposite edge, a member having a channel near one edge adapted to receive said rib and carrying means adapted to coöperate with the outside of said lug, to hold the plate and member in closed position.

3. As an article of manufacture, a member for a fastener consisting of a plate formed with an aperture adjacent one edge, the material between the said edge and the aperture forming a rib, and being offset from the plane of the plate, ridges formed on the two sides of the aperture adjacent the rib, and an upstanding lug adjacent the edge of the plate opposite the rib.

4. As an article of manufacture a member for a fastener consisting of a plate formed with a channel adjacent one edge and an aperture spaced therefrom, and a spring catch adapted to project through said aperture and slightly on the side opposite the channel.

In testimony whereof I affix my signature

DANIEL LAUER.